(12) United States Patent
de Jong et al.

(10) Patent No.: US 9,151,912 B2
(45) Date of Patent: Oct. 6, 2015

(54) OPTICAL FIBER SEGMENT HOLDERS INCLUDING SHIELDED OPTICAL FIBER SEGMENTS, CONNECTORS, AND METHODS

(75) Inventors: Michael de Jong, Colleyville, TX (US); Micah C. Isenhour, Lincolnton, NC (US); Dennis M. Knecht, Hickory, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 89 days.

(21) Appl. No.: 13/536,387

(22) Filed: Jun. 28, 2012

(65) Prior Publication Data

US 2014/0003767 A1    Jan. 2, 2014

(51) Int. Cl.
*G02B 6/32* (2006.01)
*G02B 6/42* (2006.01)
*G02B 6/43* (2006.01)

(52) U.S. Cl.
CPC ............ *G02B 6/4206* (2013.01); *G02B 6/4214* (2013.01); *G02B 6/43* (2013.01); *G02B 6/4212* (2013.01); *G02B 6/4292* (2013.01)

(58) Field of Classification Search
CPC .. G02B 6/4206; G02B 6/4212; G02B 6/4214; G02B 6/43; G02B 6/4292
USPC .................................................. 385/33, 39
See application file for complete search history.

(56) References Cited

U.S. PATENT DOCUMENTS

| | | | |
|---|---|---|---|
| 4,213,677 A | 7/1980 | Sugimoto et al. | 350/96.18 |
| 4,268,112 A | 5/1981 | Peterson | 350/96.18 |
| 4,701,011 A | 10/1987 | Emkey et al. | 350/96.18 |
| 5,163,107 A | 11/1992 | Garriss | 385/74 |
| 5,172,271 A | 12/1992 | Sinclair | 359/652 |
| 5,333,225 A | 7/1994 | Jacobowitz et al. | 385/93 |
| 5,384,874 A | 1/1995 | Hirai et al. | 385/34 |
| 5,400,419 A * | 3/1995 | Heinen | 385/14 |
| 5,680,492 A | 10/1997 | Hopler et al. | 385/34 |
| 5,754,719 A | 5/1998 | Chen et al. | 385/34 |
| 5,784,512 A | 7/1998 | Hensen | 385/61 |
| 5,832,153 A | 11/1998 | Duck | 385/34 |
| 5,850,493 A | 12/1998 | Cheng | 385/34 |
| 5,923,802 A | 7/1999 | Giebel et al. | 385/76 |
| 6,012,852 A | 1/2000 | Kadar-Kallen et al. | 385/74 |
| 6,033,125 A | 3/2000 | Stillie et al. | 385/75 |

(Continued)

FOREIGN PATENT DOCUMENTS

| AU | 199898138 B2 | 8/1999 | ............... G02B 6/32 |
|---|---|---|---|
| JP | 63-293510 | 11/1988 | ............... G02B 6/42 |

(Continued)

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

(Continued)

*Primary Examiner* — Peter Radkowski

(57) ABSTRACT

An optical fiber segment holder includes a lens holder body comprising a mating surface having a light transmissive material. At least one optical fiber segment is disposed in the lens holder body. The at least one optical fiber segment having an end face located behind the mating surface such that light travels to or from the at least one optical fiber segment through the mating surface.

14 Claims, 5 Drawing Sheets

(56) References Cited

U.S. PATENT DOCUMENTS

| | | | |
|---|---|---|---|
| 6,035,084 A | 3/2000 | Haake et al. | 385/49 |
| 6,157,485 A | 12/2000 | Cheng | 359/495 |
| 6,246,026 B1 | 6/2001 | Vergeest | 219/121.72 |
| 6,542,665 B2 | 4/2003 | Reed et al. | 385/34 |
| 6,619,858 B1 | 9/2003 | Lytel et al. | 385/89 |
| 6,632,025 B2 | 10/2003 | Ukrainczyk | 385/70 |
| 6,655,850 B2 | 12/2003 | Mann et al. | 385/74 |
| 6,687,424 B1 | 2/2004 | Ishikawa | 385/34 |
| 6,736,547 B2 | 5/2004 | Stevens et al. | 385/61 |
| 6,782,161 B2 | 8/2004 | Townsend et al. | 385/25 |
| 6,837,625 B2 | 1/2005 | Schott et al. | 385/60 |
| 6,899,464 B2 | 5/2005 | Stevens et al. | 385/53 |
| 6,901,221 B1 | 5/2005 | Jiang et al. | 398/138 |
| 6,963,687 B2 | 11/2005 | Vergeest et al. | 385/123 |
| 7,031,567 B2 | 4/2006 | Grinderslev et al. | 385/34 |
| 7,077,576 B2 | 7/2006 | Luther et al. | 385/59 |
| 7,104,701 B1 | 9/2006 | Durrant et al. | 385/74 |
| 7,164,818 B2 | 1/2007 | Bryan et al. | 385/33 |
| 7,234,874 B2 | 6/2007 | Morse et al. | 385/53 |
| 7,329,050 B1 | 2/2008 | Dugan et al. | 385/55 |
| 7,346,236 B2 | 3/2008 | Asano et al. | 385/34 |
| 7,346,237 B2 | 3/2008 | Matsumura et al. | 385/34 |
| 7,357,005 B2 | 4/2008 | Matsumura et al. | 65/387 |
| 7,460,750 B2 | 12/2008 | Durrant et al. | 385/35 |
| 7,572,071 B1 | 8/2009 | Wu | 385/94 |
| 7,603,008 B2 | 10/2009 | Matsumura et al. | 385/35 |
| 7,775,725 B2 | 8/2010 | Grinderslev | 385/74 |
| 8,165,432 B2 | 4/2012 | Ohta et al. | 385/15 |
| 2002/0031301 A1* | 3/2002 | Sasaki et al. | 385/34 |
| 2002/0146211 A1 | 10/2002 | Stevens et al. | 385/61 |
| 2002/0172474 A1* | 11/2002 | Kim et al. | 385/88 |
| 2003/0012513 A1 | 1/2003 | Ukrainczyk | 385/61 |
| 2003/0021543 A1 | 1/2003 | Mann et al. | 385/74 |
| 2004/0009697 A1 | 1/2004 | Clark et al. | 439/362 |
| 2004/0105628 A1 | 6/2004 | Morse et al. | 385/89 |
| 2004/0175073 A1 | 9/2004 | Grinderslev et al. | 385/34 |
| 2005/0018969 A1* | 1/2005 | Deane | 385/49 |
| 2006/0110104 A1* | 5/2006 | Sakai | 385/33 |
| 2006/0222299 A1 | 10/2006 | Durrant et al. | 385/74 |
| 2007/0116408 A1 | 5/2007 | Eberle et al. | 385/31 |
| 2007/0133928 A1 | 6/2007 | Ko et al. | 385/88 |
| 2008/0050072 A1 | 2/2008 | Durrant et al. | 385/74 |
| 2008/0279509 A1 | 11/2008 | Durrant et al. | 385/72 |
| 2009/0041412 A1 | 2/2009 | Danley et al. | 385/85 |
| 2009/0252455 A1* | 10/2009 | Ohta et al. | 385/42 |
| 2009/0324175 A1 | 12/2009 | Everett et al. | 385/72 |
| 2009/0324176 A1 | 12/2009 | Cheng et al. | 385/73 |
| 2010/0027943 A1 | 2/2010 | Armani et al. | 385/74 |
| 2010/0104244 A1 | 4/2010 | Grinderslev | 385/74 |
| 2010/0215325 A1* | 8/2010 | Tamura et al. | 385/89 |
| 2010/0284651 A1 | 11/2010 | Krähenbühl et al. | 385/35 |
| 2011/0069930 A1* | 3/2011 | Lin | 385/88 |
| 2011/0091156 A1 | 4/2011 | Laughlin | 385/34 |
| 2011/0317959 A1 | 12/2011 | Ohta et al. | 385/38 |
| 2012/0099822 A1 | 4/2012 | Kuffel et al. | 385/78 |
| 2012/0155803 A1 | 6/2012 | Benjamin et al. | 385/33 |
| 2012/0155807 A1 | 6/2012 | Knapp | 385/61 |

FOREIGN PATENT DOCUMENTS

| | | | | |
|---|---|---|---|---|
| JP | 2008191402 A | * | 8/2008 | |
| JP | 2011141456 A | * | 7/2011 | |
| JP | 2013122503 A | * | 6/2013 | |
| WO | WO01/11409 A2 | | 2/2001 | G02B 23/24 |
| WO | WO03/076993 A1 | | 9/2003 | G02B 6/32 |

OTHER PUBLICATIONS

Emkey, et al., "Analysis and Evaluation of Graded-Index Fiber-Lenses," Journal of Lightwave Technology, vol. LT-5, No. 9, Sep. 1987, pp. 1156-1164.

Palais, Joseph C, "Fiber coupling using graded-index rod lenses," Applied Optics, Jun. 15, 1980, vol. 19, No. 12, pp. 2011-2018.

http://www.cvimellesgroit.com, "Gradient-Index Lenses".

Chanclou, et al., "Design and demonstration of a multicore single-mode fiber coupled lens device," Optics Communications 233, 2004, pp. 333-339.

Senior, et al., "Misalignment losses at multimode graded-index fiber splices and GRIN rod lens couplers," Applied Optics, Apr. 1, 1985, vol. 24, No. 7, pp. 977-983.

Gilsdorf, et al., "Single-mode fiber coupling efficiency with graded-index rod lenses," Applied Optics, Jun. 1, 1994, vol. 33, No. 16, pp. 3440-3445.

Cusworth, et al., "Angular tilt misalignment loss at a GRIN rod lens coupler," Applied Optics, Jun. 1, 1986, vol. 25, No. 11, pp. 1775-1779.

Patent Cooperation Treaty, International Search Report and Written Opinion, May 24, 2011, 8 pgs.

* cited by examiner

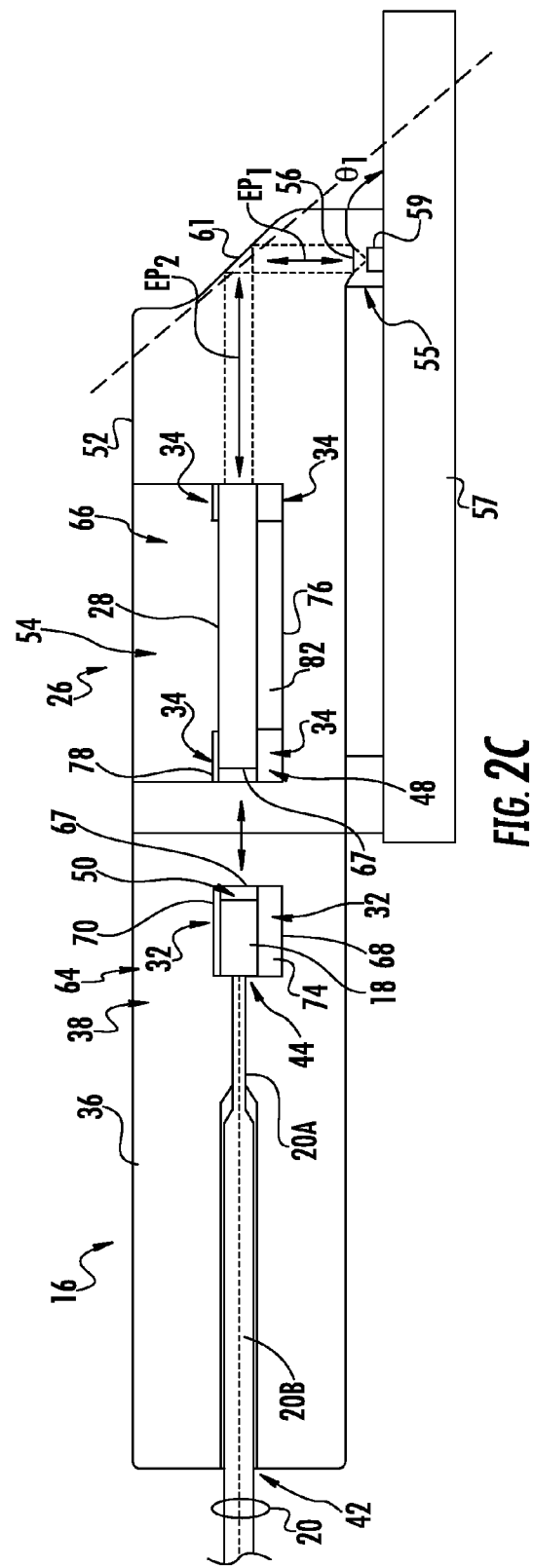

OPTICAL FIBER SEGMENT HOLDERS INCLUDING SHIELDED OPTICAL FIBER SEGMENTS, CONNECTORS, AND METHODS

FIELD

The technology of the disclosure relates to optical fiber segment holders configured to support optical fiber segments within the holder, such as gradient index (GRIN) lenses or the like, wherein the optical fiber segment holders may be employed in plugs and receptacles for facilitating optical connections.

BACKGROUND

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support optical fiber interconnections.

Fiber optic connectors are provided to facilitate optical connections with optical fibers for the transfer of light. For example, optical fibers can be optically connected (i.e., in optical communication with) to another optical device, such as a light-emitting diode (LED), laser diode, or opto-electronic device for light transfer. As another example, optical fibers can be optically connected to other optical fibers through mated fiber optic connectors. In any of these cases, it is important that the end face of an optically connected optical fiber be precisely aligned with the optical device or other optical fiber to avoid or reduce coupling loss. For example, the optical fiber is disposed through a ferrule that precisely locates the optical fiber with relation to the fiber optic connector housing.

It is common to provide flat end-faced multi-fiber ferrules to more easily facilitate multiple optical fiber connections between the fiber optic connector supporting the ferrule and other fiber optic connectors or other optical devices. In this regard, it is important that fiber optic connectors be designed to allow the end faces of the optical fibers disposed in the ferrule to be placed into contact or closely spaced with an optical device or other optical fiber for light transfer. In conventional multi-fiber, fiber optic connectors for telecommunication applications, the excess fiber is removed by laser cleaving and the remaining protruding fiber may be precision polished to form a highly planar fiber array. This high precision polishing can be costly, difficult and time consuming.

Gradient index (GRIN) lenses offer an alternative to high precision polishing. GRIN lenses focus light through a precisely controlled radial variation of the lens material's index of refraction from the optical axis to the edge of the lens. The internal structure of this index gradient can dramatically reduce the need for tightly controlled surface curvatures and results in a simple, compact lens. This allows a GRIN lens with flat surfaces to collimate light emitted from an optical fiber or to focus an incident beam into an optical fiber. The GRIN lens can be provided in the form of a glass rod that is disposed in a lens holder as part of a fiber optic connector. The flat surfaces of a GRIN lens allow easy bonding or fusing of one end to an optical fiber disposed inside the fiber optic connector with the other end of the GRIN lens disposed on the ferrule end face. The flat surface on the end face of a GRIN lens can reduce aberrations, because the end faces can be polished to be planar or substantially planar to the end face of the ferrule. The flat surface of the GRIN lens allows for easy cleaning of end faces of the GRIN lens. It is important that the GRIN lens holder be designed with internal holders that place and secure the GRIN lenses in alignment with the desired angular accuracy to avoid or reduce coupling loss.

SUMMARY

Embodiments disclosed herein include lens holders such as gradient index (GRIN) lens holders that include at least one optical fiber segment within the lens holder having mating surface with a light transmissive material. Although, the term GRIN lens holders is used in the description for describing the concepts, it is understood that any suitable optical fiber segments may be used within the lens holder as desired. As non-limiting examples the lens holder may be used as a stand-alone assembly or as part of a lager assembly such as connectors including plugs, receptacles and the like. For instance, the GRIN lens holders disclosed herein can be provided as part of an optical fiber ferrule and/or a fiber optic component or connector for making optical connections. A fiber optic connector containing the GRIN lens holders disclosed herein may be optically connected to one or more optical fibers in another fiber optic connector or to an optical device, such as a light-emitting diode, laser diode, vertical-cavity surface-emitting laser (VCSEL), or opto-electronic device for light transfer. As another non-limiting example, the GRIN lens holders disclosed herein can be provided as part of a plug or receptacle containing one or more optical fibers for establishing optical connections.

In this regard, in one embodiment, an optical fiber segment holder includes a lens holder body comprising a mating surface. At least one optical fiber segment is disposed in the lens holder body. The at least one optical fiber segment having an end face located behind the mating surface such that light travels to or from the at least one optical fiber segment through the mating surface.

In another embodiment, a method of providing a gradient index (GRIN) lens for a fiber optic connector is provided. The method includes providing a lens holder body comprising an internal chamber, a recessed floor disposed in the internal chamber, a first raised side disposed on a first side of the recessed floor, a second raised side disposed on a second side of the recessed floor and a mating surface extending between the first and second raised sides. At least one GRIN lens is disposed in the internal chamber of the lens body such that an end face of the at least one GRIN lens is located behind the mating surface such that light travels to or from the at least one GRIN lens through the mating surface.

In another embodiment, an optical fiber segment holder includes a single-piece component lens holder body comprising an internal chamber and a mating surface comprising a light transmissive material. At least one optical fiber segment is disposed in the internal chamber and has an end face located behind the mating surface such that light travels to or from the at least one optical fiber segment through the mating surface.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

FIG. 2C is a schematic side cut-away view of the GRIN lens holder for the plug in FIG. 2A mated to the GRIN lens holder for a receptacle in FIG. 2A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include gradient index (GRIN) lens holders that shield the GRIN lenses behind a mating surface of the GRIN lens holders. Groove alignment features may also be employed for aligning the GRIN lenses within the GRIN lens holders. Non-limiting examples of connectors include plugs and receptacles. In one embodiment, the GRIN lenses include end faces that are shielded behind the mating surfaces of the GRIN lens holders. The end faces of the GRIN lenses may be use such as be at least partially encapsulated within an index matching adhesive to reduce loss degradation due to surface effects of the immersed end faces. Groove alignment features may be used to secure the one or more GRIN lenses in the GRIN lens holder. The groove alignment features may also be configured to accurately align the end faces of the GRIN lenses behind the mating surfaces of the GRIN lens holders. The GRIN lens holders disclosed herein can be provided as part of an optical fiber ferrule and/or a fiber optic component or connector for making optical connections. A fiber optic connector containing the GRIN lens holders disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer. As a non-limiting example, the GRIN lens holders disclosed herein can be provided as part of a plug or receptacle containing one or more optical fibers for establishing optical connections. While GRIN lens holders and GRIN lenses are discussed below, other optical fiber segments, such as multimode fiber segments may be employed along with optical fiber segment holders where the optical fiber segments behave in a fashion similar to that of GRIN lenses. Such optical fiber segment holders may have similar or the same characteristics as the holders described below.

Figure 1:
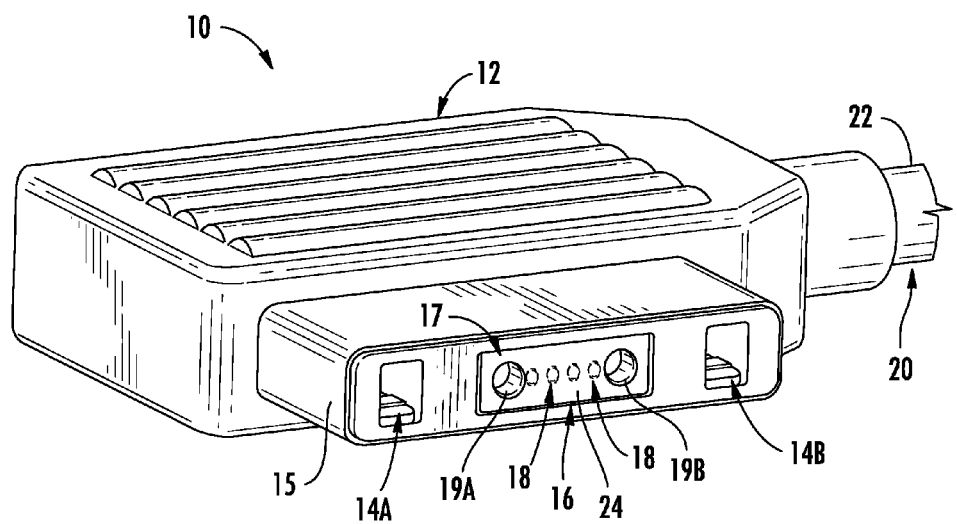
FIG. 1 is a perspective view of an exemplary cable plug employing a gradient index (GRIN) lens holder comprised of a seamless lens holder body employing internal groove alignment features for securing and aligning GRIN lenses.

In this regard, FIG. 1 is a perspective view of an exemplary connector 10 employing a GRIN lens holder configured to support and align GRIN lenses. The connector 10 in this embodiment is provided in the form of a plug 12. For example, the plug 12 may be a fiber optic connection plug that exclusively supports optical components for establishing optical connections. Alternatively, the plug 12 may also optionally include electrical components, such as power conductors 14A, 14B disposed in the plug 12 for establishing electrical connections, as a non-limiting example.

With continuing reference to FIG. 1, the plug 12 in this embodiment employs a gradient index (GRIN) lens holder 16 to support optical components for establishing optical connections. The GRIN lens holder 16 is disposed in a connector housing 15 of the plug 12. The GRIN lens holder 16 could be disposed in a ferrule 17 that is disposed in the connector housing 15, as an example. The GRIN lens holder 16 is configured to support and align one or more GRIN lenses (shown by dotted lines 18) disposed in the GRIN lens holder 16. For example, the GRIN lens holder 16 disposed in the plug 12 in FIG. 1 is configured to support up to four (4) GRIN lenses. As will be described in greater detail below, the GRIN lenses 18 a located behind a mating surface 24 of the GRIN lens holder 16.

The GRIN lenses 18 may be optically coupled or fused to optical fibers 20 disposed in a cable 22 secured to the plug 12. In this manner, an optical connection made to the GRIN lenses 18 disposed in the GRIN lens holder 16 through a mating of the plug 12 to a receptacle or other optical component establishes an optical connection to the optical fibers 20. Alignment openings 19A, 19B are disposed in the plug 12 to assist in alignment of the plug 12 to a receptacle when the plug 12 is mated to a receptacle.

The GRIN lenses 18 focus light through a precisely controlled radial variation of the lens material's index of refraction from the optical axis to the edge of the lens. The internal structure of this index gradient can dramatically reduce the need for tightly controlled surface curvatures and results in a simple, compact lens. This allows the GRIN lenses 18 with flat surfaces to collimate light emitted from the optical fibers 20 or to focus an incident beam into the optical fibers 20. In this embodiment, the GRIN lenses 18 are provided in the form of glass rods that are disposed behind the mating surface 24 of the GRIN lens holder 16. The mating surface 24 may be formed of a light transmissive material to allow the light to pass through the mating surface 24.

The flat mating surface 24 of the GRIN lens holder can provide improved ability to clean the mating surface 24 for connection to another component. The mating surface 24 may have no seams or other features, such as voids extending into or out of the mating surface 24 in regions of the GRIN lenses 18, which allows for simplified cleaning and for improved cleaning results. In other words, the mating surface 24 may be featureless (i.e., a planar surface). Such a featureless mating surface 24 can also allow for improved mating between the mating surface 24 and another mating surface. The GRIN lens holder 16 may also include internal alignment features that support and align the GRIN lenses 18 in alignment with GRIN lens holder 16 and the plug 12 to avoid or reduce coupling loss between the GRIN lenses 18 and optical components optically connected to the GRIN lens 18 through a mating to the plug 12.

Figure 2A:
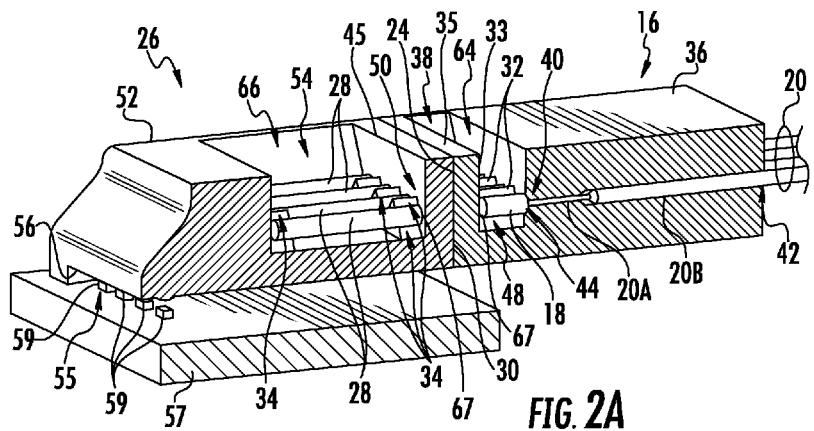
FIG. 2A is a perspective cross-sectional view of the GRIN lens holder of the plug of FIG. 1 mated with a GRIN lens holder for a receptacle, to optically connect GRIN lenses disposed in the GRIN lens holder of the plug with the GRIN lenses disposed in the GRIN lens holder of the receptacle.
Figure 2B:
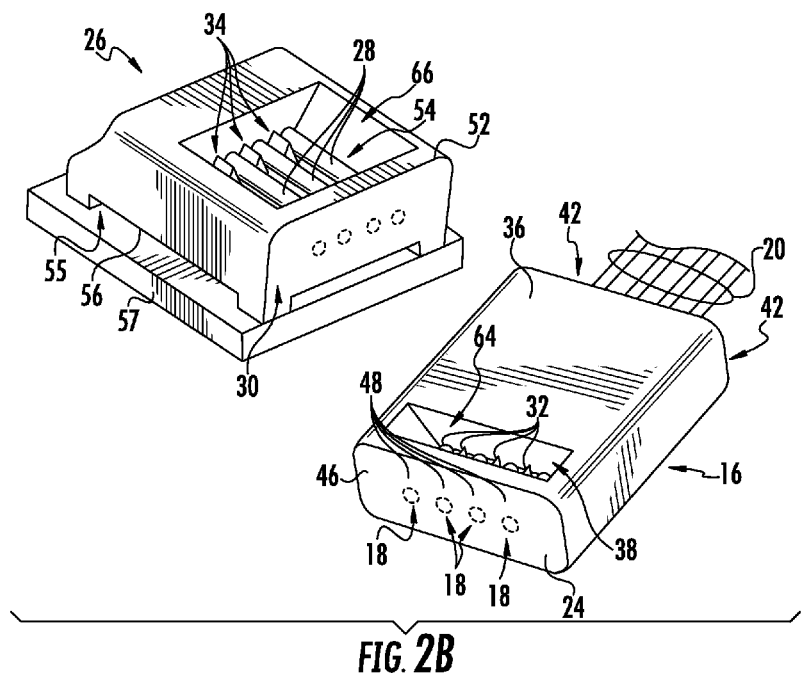
FIG. 2B is a perspective view of the GRIN lens holder of the plug of FIG. 1 and the GRIN lens holder of the receptacle in FIG. 2A unmated.

In this regard, FIG. 2A is a perspective view of the GRIN lens holder 16 of the plug 12 of FIG. 1 mated with a GRIN lens holder 26 for a receptacle connector (not shown for clarity). The GRIN lens holder 16 and the GRIN lends holder 26 can be mated to optically connect the GRIN lenses 18 disposed in the GRIN lens holder 16 of the plug 12 with GRIN lenses 28 disposed in the GRIN lens holder 26 through mating surfaces 24 and 30. Any suitable alignment features may be used at the mating surfaces 24 and 30 such as grooves, holes, projections, etc. that can mate together to provide optical alignment between the GRIN lens holders 16 and 26. FIG. 2B is a perspective view of the GRIN lens holder 16 and the GRIN lens holder 26 in FIG. 2A unmated. FIG. 2C is a side view of the GRIN lens holder 16 mated to the GRIN lens holder 26 in FIG. 2A.

As illustrated in FIGS. 2A and 2C, the mating surface 24 of the GRIN lens holder 16 is configured to abut with a mating surface 30 (FIG. 2C) of the GRIN lens holder 26 to optically connect their respective supported GRIN lenses 18, 28 through the mating surfaces 24 and 30 and connecting walls 35 and 45 formed of a light transmissive material. The GRIN lenses 18, 28 may be aligned with their respective GRIN lens holders 16, 26 and their respective mating surfaces 24, 30 to reduce coupling losses when the mating surfaces 24, 30 are abutted to each other to optically connect their respective supported GRIN lenses 18, 28. In this regard, as illustrated in FIGS. 2A and 2B and discussed in more detail below with regard to FIGS. 3-4B, the GRIN lens holders 16, 26 both contain groove alignment features 32, 34, respectively. The groove alignment features 32, 34 are cuts, indentations, or channels disposed in the surface of the GRIN lens holders 16, 26. The groove alignment features 32, 34 are configured to support the GRIN lenses 18, 28 disposed in the GRIN lens holders 16, 26, and to align the GRIN lenses 18, 28 behind the mating surfaces 24, 30. By providing the groove alignment features 32, 34, the alignment of the GRIN lenses 18, 28 provided by the GRIN lens holders 16, 26 may be more accurate than alternative methods, such as using pins to dispose alignment through-holes or bores in a lens holder body.

Also, in this embodiment, the groove alignment features 32, 34 are provided as part of an integrated single-piece component structure of the GRIN lens holders 16, 26. For example, the groove alignment features 32, 34 can be provided as part of a mold or stamp used to mold or stamp manufacture the GRIN lens holders 16, 26. Mold manufacturing the GRIN lens holders 16, 26 can reduce manufacturing steps, manufacturing cost, and providing accurate alignment of the supported GRIN lenses 18, 28.

As illustrated in FIGS. 2A-2C, the GRIN lens holder 16 for the plug 12 (FIG. 1) in this embodiment is comprised of a lens holder body 36. An internal chamber 38 is disposed in the lens holder body 36. The GRIN lenses 18 are disposed and arranged in the internal chamber 38. The GRIN lenses 18 can be fused or optically connected to end portions 40 of bare optical fiber portions 20A of coated optical fiber portions 20B of the optical fibers 20 disposed in the internal chamber 38. For example, the bare optical fiber portions 20A may be one hundred twenty-five (125) micrometers (µm) in diameter, and the coated optical fiber portions 20B may be two hundred fifty (250) µm in diameter, as non-limiting examples. To provide for the end portions 40 of the optical fibers 20 to be disposed in the internal chamber 38 of the lens holder body 36, light port openings 42 are disposed in the lens holder body 36. The light port openings 42 are coupled in free space to the internal chamber 38. For example, the light port openings 42 may be holes disposed in the lens holder body 36. The end portions 40 of the optical fibers 20 can be inserted into the light port openings 42 to be optically connected to end portions 44 of the GRIN lenses 18 for optical connection.

With continuing reference to FIGS. 2A-2C, to provide for locating the GRIN lenses 18 in close proximity to other optical components, such as the GRIN lenses 28, the mating surface 24 is disposed in the lens holder body 36. The mating surface 24 provides a planar or substantially planar mating surface 46 for abutment to the mating surface 30 or another optical component to bring end faces 48 of the GRIN lenses 18 in proximity to the other optical components for light transfer. While a planar mating surface 24 is illustrated, other non-planar mating surface configurations are possible. In this example, the end faces 48 of the GRIN lenses 18 are located behind the connecting wall 35, the GRIN lenses 18 terminating prior to reaching the mating surface 24. The end faces 48 may be encapsulated (i.e., buried) within an index matching adhesive 67 at an internal surface 33 of the connecting wall 35. The GRIN lenses 18 may terminate prior to or abut the internal surface 33 of the connecting wall 35. In other embodiments, the end faces 48 of the GRIN lenses 18 may be received within the connecting wall 35, but terminate prior to reaching the mating surface 24.

In some embodiments, the end faces 48 of the GRIN lenses 18 are planar or substantially planar (e.g., within 25-50 µm) and are optically connected to end faces 50 of the GRIN lenses 28 in the GRIN lens holder 26, through the connecting walls 35 and 45. In this regard, the GRIN lens holder 26 includes a lens holder body 52. The lens holder body 52 also contains an internal chamber 54 disposed in the lens holder body 52. The GRIN lenses 28 are disposed and arranged in the internal chamber 54 as will be discussed in more detail below with regard to FIGS. 4A and 4B.

With reference to FIG. 2B, the GRIN lenses 28 can be arranged to transfer light, directly or indirectly, through lenses 55 disposed in the surface 56 (FIG. 4B) extending through the lens holder body 52. The lens holder body 52 may be made from a light transmissive material at the desired wavelengths so that the lenses 55 disposed in the surface 56 can receive light from a light source. In this embodiment, the GRIN lens holder 26 is mounted to a printed circuit board (PCB) 57 that contains optical devices 59 (see also, FIG. 4B). For example, the optical devices 59 may be optical transmitters or receivers, for example vertical-cavity surface-emitting lasers (VCSELs) and photodiodes (e.g., pin diodes), respectively. The optical devices 59 are aligned with the lenses 55 for either transmitting light to or receiving light through lenses 55 from the GRIN lenses 28 which are aligned with the lenses 55 in the lens holder body 52. For example, the optical devices 59 may be arranged in an alternating fashion between transmitter and receiver optical devices 59. As shown in FIG. 2C, a total internal reflection (TIR) surface 61 is provided in the lens holder body 52 to reflect light to and from the GRIN lenses 28 disposed therein. For example, the TIR surface 61 may be disposed at angle $\Theta_1$ relative to the emission path $EP_1$, which is forty-five (45) degrees in the non-limiting example of the lens body holder 52. Light received through lenses 55 transmitted from a transmitter optical device 59 disposed on a surface 56 is emitted in emission path $EP_1$. This light is reflected off of the TIR surface 61 into emission path $EP_2$ to the GRIN lenses 28. Similarly, light received from the GRIN lenses 28 in emission path $EP_2$ is reflected off of the TIR surface 61 into emission path $EP_1$ to be transmitted to the lenses 55 and received by a receiver optical device 59.

Note that the lens holder bodies 36, 52 may be constructed from a polymer or any other material that is suitable for supporting the GRIN lenses 18, 28 and the optical fibers 20 disposed in the lens holder bodies 36, 52. Portions of the lens holder bodies 36 and 52 through which light travels may be made from a light transmissive material. Other portions of the lens holder bodies 36 and 52 may be formed of a light transmissive material or a different material. As non-limiting examples, the lens holder bodies 36, 52 may be produced from a mold in a molding process. For example, the lens holder bodies 36, 52 in this embodiment are provided as a one-piece component to provide seamless mating surfaces 24, 30. Providing seamless mating surfaces 24, 30 can reduce the potential for debris to enter through or be deposited in the seams and come into contact with the GRIN lenses 18, 28 resulting in light transfer losses.

With reference to FIGS. 2A and 2C, the groove alignment features 32, 34 in the respective lens holder bodies 36, 52 are optically aligned with each other when connected or mated together. In this regard, when the GRIN lenses 18, 28 are supported by the groove alignment features 32, 34, the GRIN lenses 18, 28 and their end faces 48, 50 are aligned.

With continuing reference to FIGS. 2A and 2C, to install the GRIN lenses 18 in the GRIN lens holder 16, the GRIN lenses 18 may be disposed in the groove alignment features 32 in the internal chamber 38 through an opening in the lens holder body 36. The index matching adhesive 67 or epoxy or an index matching gel having an index of refraction for index matching may be disposed at the end faces 48 to secure the GRIN lenses 18 in the groove alignment features 32 of the lens holder body 36. A cover may be used with the index matching adhesive 67 to aid in holding the GRIN lenses in the GRIN lens holder 16. As discussed above, the optical fibers 20 may be disposed in the lens holder body 36 through the light port openings 42. End portions 40 of the bare optical fiber portions 20A, provided by removing coating from coated optical fiber portions 20B, may be inserted through the light port openings 42. The bare optical fiber portions 20A may be brought into contact or in close contact with the end portions 44 of the GRIN lenses 18 to optically connect the optical fibers 20 with the GRIN lenses 18.

Similarly, with continuing reference to FIGS. 2A and 2C, to install the GRIN lenses 28 in the GRIN lens holder 26, the GRIN lenses 28 may be disposed in the groove alignment features 34 in the internal chamber 54 through an opening 66 in the lens holder body 52. The index matching adhesive 67 or index matching gel that has an index of refraction for index matching may be disposed in at the end faces 50 to secure the GRIN lenses 28 in the groove alignment features 34 of the lens holder body 52.

Figure 3:
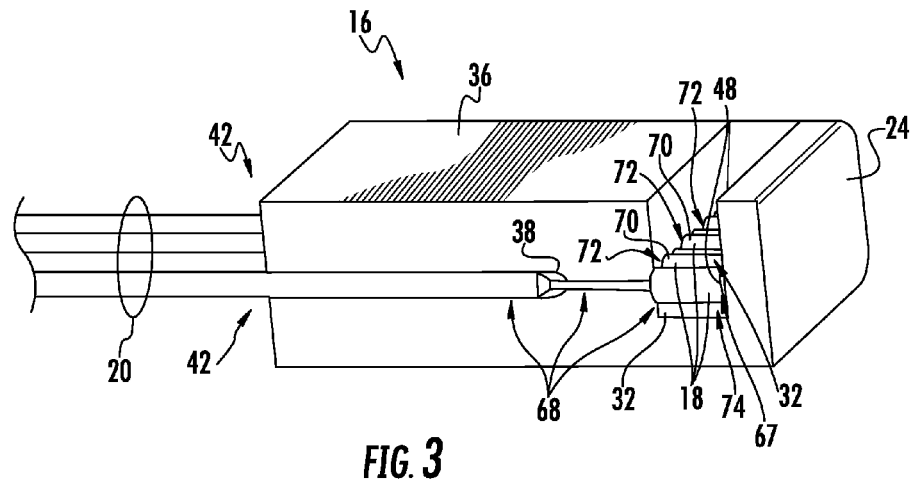
FIG. 3 is a close-up cut-away perspective view of the GRIN lens holder of the plug in FIG. 1 with GRIN lenses disposed in groove alignment features internal to the seamless lens holder body of the GRIN lens holder.

To provide further detail on the groove alignment features 32 disposed in the GRIN lens holder 16 of the plug 12 in FIG. 1, FIG. 3 is provided. FIG. 3 is a close-up perspective view of the GRIN lens holder 16 of the plug 12 in FIG. 1. FIGS. 2C and 3 illustrate more detail on the GRIN lenses 18 as disposed in the groove alignment features 32 to align the GRIN lenses 18. In this embodiment, the groove alignment features 32 are disposed in a recessed floor 68 in the internal chamber 38 of the GRIN lens holder 16. The groove alignment features 32 are formed by disposing wedge-shaped members 70 side-by-side on each side of the recessed floor 68 (FIG. 2C) of the internal chamber 38. Side-by-side wedge-shaped members 70 form V-shaped grooves 72 therebetween that can support each end of the GRIN lenses 18 in the internal chamber 38.

With continuing reference to FIG. 3, the wedge-shaped members 70 are disposed in the internal chamber 38 such that the V-shaped grooves 72 are side-by-side and parallel. The V-shaped grooves 72 could also be disposed in the internal chamber 38 to be aligned with the light port openings 42, as provided in the lens holder body 36. The V-shaped grooves 72 also provide standoffs for the GRIN lenses 18 to be disposed with a gap 74 to the recessed floor 68 (FIG. 2C) of the internal chamber 38. Providing for the gap 74 allows any debris or other material inside the internal chamber 38 to be collected out of contact with the GRIN lenses 18 to avoid light transfer losses. While V-shaped grooves are shown, other grove types may be used as alignment features, such as U-shaped grooves or channels.

Figure 4A:
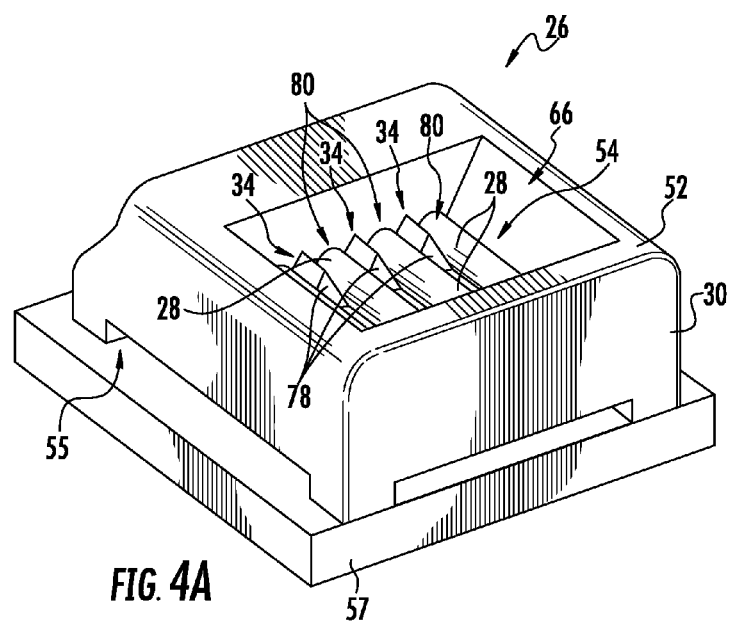
FIG. 4A is a close-up perspective view of the GRIN lens holder and optical device in FIG. 2A, with GRIN lenses secured in groove alignment features disposed internally in the seamless lens holder body of the receptacle GRIN lens holder.
Figure 4B:
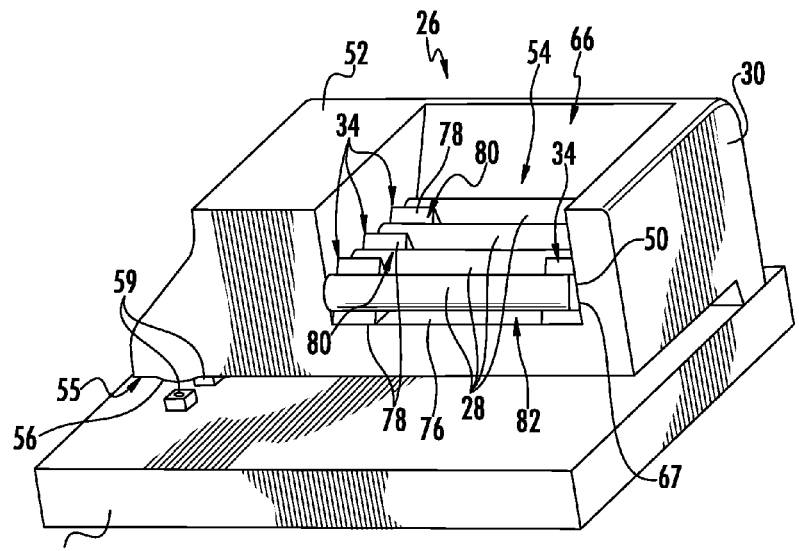
FIG. 4B is a close-up perspective cut-away view of the seamless lens holder body of the receptacle GRIN lens holder in FIG. 4A.
Figure 4C:
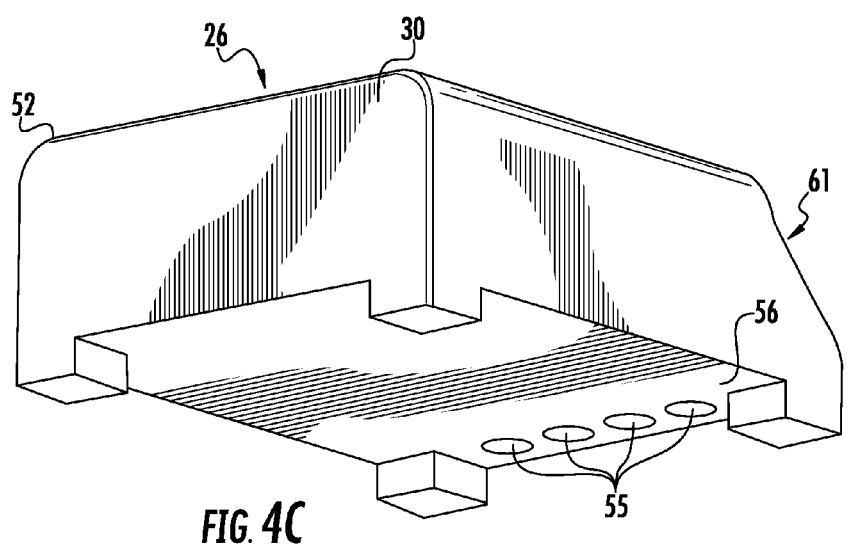
FIG. 4C is a close-up bottom perspective view of the GRIN lens holder and optical device in FIG. 2A.

To provide further detail on the groove alignment features 34 disposed in the GRIN lens holder 26 in FIGS. 2A-2C, FIGS. 4A-4C are provided. FIG. 4A is a close-up perspective view of the receptacle GRIN lens holder 26 mounted on a PCB 57 in FIG. 2A, also with GRIN lenses 28 secured in groove alignment features disposed internally in GRIN lens holder 26. FIG. 4B is the close-up perspective cross-section view of the GRIN lens holder 26 in FIG. 4A. FIG. 4C is the close-up bottom perspective view of the GRIN lens holder 26 in FIG. 4A. FIGS. 4A-4C illustrate in more detail the GRIN lenses 28 as disposed in the groove alignment features 34 to align the GRIN lenses 28. In this embodiment, the groove alignment features 34 are disposed in a recessed floor 76 in the internal chamber 54 of the GRIN lens holder 26. The groove alignment features 34 are formed by disposing wedge-shaped members 78 side-by-side on each side of the recessed floor 76 of the internal chamber 54. Side-by-side wedge-shaped members 78 form V-shaped grooves 80 therebetween that can support each end of the GRIN lenses 28 in the internal chamber 54.

The V-shaped grooves 80 may be disposed in the internal chamber 54 to be aligned with the lenses 55, as provided in the lens holder body 52. The V-shaped grooves 80 may also provide standoffs for the GRIN lenses 28 to be disposed with a gap 82 to the recessed floor 76 of the internal chamber 54. Providing for the gap 82 allows any debris or other material inside the internal chamber 54 to be collected out of contact with the GRIN lenses 28 to avoid light transfer losses. With reference to FIG. 4C, the lenses 55 are shown, that are provided by the light transmissive material of the lens body holder 52 aligned in the emission path $EP_1$, illustrated in FIG. 2C.

As non-limiting examples, the GRIN lenses disclosed herein may comprise a generally cylindrical glass member having a radially varying index of refraction, the glass member having a length such that the lens has a pitch of less than about 0.23. As used herein, the pitch length of the lens, Lo, is $2\pi/A$; the fractional pitch, or, hereafter, pitch, is $L/Lo=LA/2\pi$, where L is the physical length of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter lenses, such as lenses having a diameter less than or equal to about one (1) mm, for example, 0.8 mm.

Examples of optical devices that can interface with the GRIN lenses disclosed in the GRIN lens holders disclosed herein include, but are not limited to, fiber optic collimators, DWDMs, OADMs, isolators, circulators, hybrid optical devices, optical attenuators, MEMs devices, and optical switches.

Further, as used herein, it is intended that terms "fiber optic cables" and/or "optical fibers" include all types of single-mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single-mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. An optical fiber segment holder of an optical connector, comprising:
    a lens holder body comprising a mating surface having a light transmissive material, wherein the mating surface defines at least a portion of an exterior wall of the optical connector; and
    at least one optical fiber segment disposed in the lens holder body, the at least one optical fiber segment having an end face located behind the mating surface such that light travels to or from the at least one optical fiber segment through the mating surface of the lens holder body of the optical connector.

2. The optical fiber segment holder of claim 1, wherein the lens holder body comprises:
    an internal chamber;
    a recessed floor disposed in the internal chamber,
    a first side at a first side of the recessed floor;
    a second side at a second side of the recessed floor; and
    the mating surface extending between the first and second raised sides; and
    wherein the at least one optical fiber segment is a gradient index (GRIN) lens disposed in the lens holder body, the GRIN lens having the end face located behind the mating surface such that light travels to or from the at least one GRIN lens through the mating surface.

3. The optical fiber segment holder of claim 2, further comprising at least one groove alignment feature disposed in the recessed floor of the internal chamber of the lens holder body and configured to support the GRIN lens.

4. The optical fiber segment holder of claim 3, wherein the at least one groove alignment feature is disposed in a floor disposed in the internal chamber, wherein the at least one groove alignment feature is configured to support the GRIN lens with a gap between the GRIN lens and the floor.

5. The optical fiber segment holder of claim 2, further comprising at least one light port opening disposed in the lens holder body and coupled in free space to the internal chamber, the at least one light port opening is configured to receive at least one end portion of at least one optical fiber.

6. The optical fiber segment holder of claim 5, wherein the at least one light port opening is configured to be optically aligned with at least one light emitter or light port of an optical device.

7. The optical fiber segment holder of claim 1, further comprising a TIR surface disposed in the lens holder body in a first optical axis, the TIR surface configured to TIR reflect light in the first optical axis.

8. The optical fiber segment holder of claim 7, wherein the at least one optical fiber segment is disposed in the lens holder body in a second optical axis, the at least one optical fiber segment configured to transmit light in the second optical axis to the TIR surface.

9. The optical fiber segment holder of claim 1, wherein the end face of the at least one optical fiber segment is at least partially encapsulated within an index matching adhesive.

10. An optical fiber segment holder of an optical connector, comprising:
    a single-piece component lens holder body comprising an internal chamber and a mating surface comprising a light transmissive material wherein the mating surface defines at least a portion of an exterior wall of the optical connector; and
    at least one optical fiber segment disposed in the internal chamber and having an end face located behind the mating surface such that light travels to or from the at least one optical fiber segment through the mating surface of the single-piece component lens holder body of the optical connector.

11. The optical fiber segment holder of claim 10, wherein the single-piece component lens holder body is further comprised of a seamless lens holder body, wherein the mating surface is comprised of a seamless mating surface having no openings for receiving the at least one optical fiber segment.

12. The optical fiber segment holder of claim 10, wherein at least one groove alignment feature is disposed in a floor disposed in the internal chamber, wherein the at least one groove alignment feature is configured to support the at least one optical fiber segment.

13. The optical fiber segment holder of claim 10, wherein the end face of the at least one optical fiber segment is at least partially encapsulated within an index matching adhesive.

14. The optical fiber segment holder of claim 10, wherein the optical fiber segment is a gradient index lens.

* * * * *